US008147104B2

(12) United States Patent
Umeda et al.

(10) Patent No.: US 8,147,104 B2

(45) Date of Patent: Apr. 3, 2012

(54) VEHICLE ROOM LIGHT APPARATUS

(75) Inventors: Yukihiko Umeda, Aichi-ken (JP); Tadaoki Ichikawa, Aichi-ken (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 268 days.

(21) Appl. No.: 12/654,877

(22) Filed: Jan. 7, 2010

(65) Prior Publication Data

US 2010/0188866 A1 Jul. 29, 2010

(30) Foreign Application Priority Data

Jan. 27, 2009 (JP) ................................ P2009-014856

(51) Int. Cl.
*B60Q 3/00* (2006.01)

(52) U.S. Cl. ......................... 362/488; 362/471; 362/490

(58) Field of Classification Search .................... 362/85, 362/249.01, 249.02, 249.05, 310, 471, 479, 362/488, 490, 494, 545, 546, 549, 800
See application file for complete search history.

(56) References Cited

U.S. PATENT DOCUMENTS 6,013,956 A * 1/2000 Anderson, Jr. ............... 307/10.1
6,851,841 B2 * 2/2005 Sugihara et al. .............. 362/490
6,945,678 B2 * 9/2005 Sugihara et al. .............. 362/490
7,213,952 B2 * 5/2007 Iwai .............................. 362/488
7,287,886 B2 * 10/2007 Iwai .............................. 362/490
7,438,452 B2 * 10/2008 Nawashiro .................... 362/490
7,547,119 B2 * 6/2009 Kuwana et al. ............... 362/294
7,677,773 B2 * 3/2010 Nagai ........................... 362/488
7,699,510 B2 * 4/2010 Yoshihara et al. ............ 362/488
7,993,042 B2 * 8/2011 Padilla .......................... 362/488
2007/0133219 A1 * 6/2007 Chaloult et al. .............. 362/490
2008/0049435 A1 2/2008 Yoshihara et al.
2008/0049436 A1 2/2008 Yoshihara et al.
2008/0158900 A1 * 7/2008 Showalter et al. ............ 362/490

FOREIGN PATENT DOCUMENTS

JP 2008-49841 3/2008
JP 2008-53065 3/2008

* cited by examiner

*Primary Examiner* — Hargobind S Sawhney
(74) *Attorney, Agent, or Firm* — McGinn IP Law Group, PLLC

(57) ABSTRACT

The present invention provides a vehicle room light apparatus which is small in size and achieves high heat dissipation. The vehicle room light apparatus includes a light source; a switch; and a case including a front surface as a designed surface and a back surface. The back surface having a first region on which the light source and the switch are arranged in line, a second region which has a space extending along the first region and an opening continuing to the space, a partition wall which separates the first and the second regions.

8 Claims, 4 Drawing Sheets

27 21 22 21 14 112 11 111 113 13 112 111 11 113 12 32 41 42 40 42

VEHICLE ROOM LIGHT APPARATUS

CROSS-REFERENCE TO RELATED APPLICATIONS

This application claims priority from Japanese Patent Application No. 2009-014856 filed on Jan. 27, 2009 and the subject matters of which are incorporated herein by reference.

TECHNICAL FIELD

Devices and apparatuses consistent with the present invention relate to a vehicle room light apparatus and improvements thereof.

BRIEF DESCRIPTION OF RELATED ARTS

A related vehicle room light apparatus includes a lot of parts, for example a switch, a substrate, heat sink, and bracket, which are attached to a housing provided at back surface side of the vehicle room light apparatus. The related vehicle room light apparatus is also packaged by parts such as a cover, a bezel, and an outer lens and is attached to a vehicle body at a predetermined position. With respect to such a vehicle room light apparatus, JP-A-2008-53065 and JP-A-2008-49841 discloses a configuration which focuses heat dissipation. A vehicle room light apparatus according to JP-A-2008-53065 includes a light source attached to a housing provided at back surface side of the vehicle room light apparatus and an opening at a back surface side region of the light source from which heat of the light source dissipate. Thus heat dissipation is enhanced. A vehicle room light apparatus according to JP-2008-49841 includes an opening at a housing provided at the back surface side of the vehicle room light apparatus and a bracket extending to the opening and fixing the light source to the housing. Heat of the light source conduct through the bracket and dissipate from the opening. Thus heat dissipation is enhanced.

The related vehicle room light apparatuses introduced above require a complicate attachment procedure due to a large number of parts in addition to above introduced parts, for example a screw which fixes the light source to the housing or the bracket. Also, since a body of the related vehicle room light apparatus is formed from a combination of the housing, the bracket, and the bezel, the body tends to be large. Therefore, it is difficult to make a space for the vehicle room light apparatus to mount in a limited space of the vehicle room. Also, the large body limits its design.

In addition, although the above introduced related vehicle room light apparatuses include the opening for heat dissipation, they do not has a mechanism which positively enables air to flow into the vehicle room light apparatus. Therefore, high heat dissipation is not expected.

SUMMARY

Exemplary embodiments of the present invention address the above disadvantage and other disadvantages not described above. The present invention provides a vehicle room light apparatus which includes a small number of parts and a small body. Also the present invention provides a vehicle room light apparatus which includes a small number of parts and has high heat dissipation.

A vehicle room light apparatus according to the present invention which address the aforementioned problems includes a light source; a switch; and a case including a front surface as a designed surface and a back surface. The back surface having a first region on which the light source and the switch are arranged in line, a second region which has a space extending along the first region and an opening continuing to the space, and a partition wall which separates the first and the second regions.

In the vehicle room light apparatus according to the present invention a light source and the switch are attached to the back surface of the case and the front surface is a designed surface. Therefore, the number of the parts is reduced as compared with a conventional configuration in which a housing, a bracket, and a bezel are used. Also the small number of the parts enables the vehicle room light apparatus to be small in size. The first region and the second region are provided on the back surface of the case and these regions are separated by the partition wall. The functional parts such as the light source and the switch are provided in the first region. On the other hand, the second region has the space and the opening which continues to the space. Since the opening works as a source and a drain for air and the space works as a channel for air, heat dissipation from the vehicle room light apparatus is promoted. The space achieves high heat dissipation because the space linearly extends along the first region in which direction the switch and the light source are arranged. As described above, the vehicle room light apparatus according to the present invention separately includes the region where the functional parts are mounted and the region which promotes heat dissipation, thereby each region is ensured and the high heat dissipation is achieved.

DETAIL DESCRIPTION OF THE EXEMPLARY EMBODIMENT OF THE PRESENT INVENTION

Figure 1:
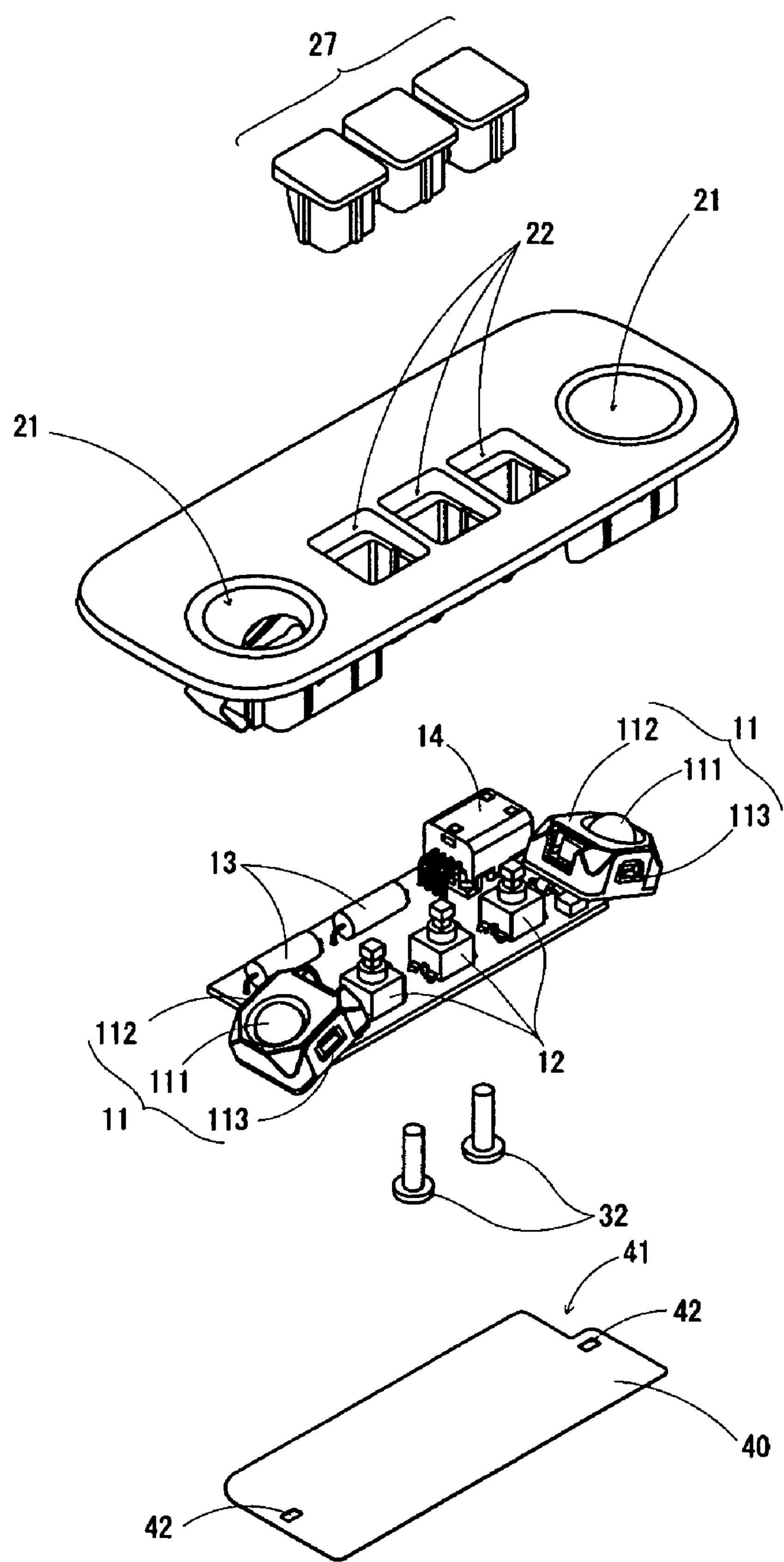
FIG. 1 is a perspective exploded view showing the exemplary embodiment of the vehicle room light apparatus seen form its front surface side.

Although not limited, LED lamp is preferable for a light source of the vehicle room light apparatus of the present invention. The reason is that LED lamp has advantages such as small size, small energy consumption, and long life. When a surface mounted type LED lamp is used as the light source, it is possible to make the vehicle room light apparatus small in size. Also, since a lamp type LED lamp emits light with high directivity, the LED lamp is suitable to illuminate occupants' hands. The luminescence color of the LED lamp is not limited. For example, white, neutral white or amber color can be adopted. As the light source, a plurality of LED lamps may be used and combination of different types of LEDs or different luminescence colors of LEDs may be used. It is preferable that the LED lamp is used as the light source in a form of LED lamp unit which includes the LED lamp and a mounting substrate for the LED lamp since parts sharing, general versatility, and operability are elevated.

The vehicle room light apparatus of the present invention includes a switch which controls the lighting condition of the light source. Conventional types of the switch may be adopted such as a push switch, tact switch, and a rotary switch. A plurality of switches can be used so that each switch corresponds to the controlled lighting condition of the light source. The switches may include different type switches.

The vehicle room light apparatus of the present invention includes a case. The light source and the switch are attached to a back surface of the case. The case has a designed surface on its front surface. Here, the front surface means a surface which faces inside of the vehicle room and the back surface means a surface which faces outside of the vehicle room. The case is made of a material, not limited, such as polypropylene resin (PP resin) or ABS resin. Especially PP resin is preferable since its high moldability and operability. The case is molded by molding like press molding or injection molding. On the front surface of the case, conventional surface treatments such as pearskin finish or mirror finish are performed. Also, a resin layer and an ink layer may be provided on the front surface. For example, a coloring may be applied or printed on the front surface of the case so as to make the front surface into a designed surface.

The case includes a first region and a second region on its back surface. The first region and the second region are separated by a partition wall. The light source and the switch are provided and aligned in the first region. For example, two light sources are provided and the switch is provided on an imaginary line which connects the two light sources.

Preferably, the light source is directly attached to the back surface of the case because the number of the parts decreases. By attaching the light source to the back surface of the case at a predetermined angle, light can be emitted in a predetermined direction. Thus light illuminates the occupants' hands and can be used as a map lamp. Other than the light source and the switch, so called functional parts such as a lens or a Zener diode may be provided in the first region. Also, a second partition wall which separates the light source and the switch may be provided. The second partition wall prevents heat of the light source from conducting to the switch.

The partition wall is formed along the first region so as to be parallel to a direction along which the light source and the switch align in the first region. The second region is defined by the partition wall and an outer wall of the case. That is, a region between the partition wall and the outer wall of the case which faces to the partition wall is the second region.

In the second region, a space and an opening are provided. The space extends along the first region in the direction along which the light source and the switch align. The opening continues to the space.

Since the space works as a channel for air and the opening works as a source for air, heat dissipation from the vehicle room light apparatus is promoted. Thus, attaching the functional parts to the first region and providing the space in the second region, each region is ensured and high heat dissipation is achieved.

Preferably, two openings are provided, The first one is at one end of the second region and the second one is at another end which opposite to the one end respectively. Since each two ends of the second region have the opening, a source and a drain for air are ensured.

It is preferable to dispose a resistance element in the space of the second region, since the resistance element generates a large amount of heat. As the resistance element is disposed in the space, heat dissipation from the resistance element is promoted and heat dissipation of the vehicle room light apparatus is enhanced. The resistance element can be mounted on the case by a substrate explained below. The substrate is attached to the back surface of the case and includes a first mounting region positioned in the first region in which the switch is mounted and a second mounting region positioned in the second region in which the resistance element is mounted. Tat is, the substrate enables the resistance element to be mounted on the space. Additionally, elements or parts which generate a lot of amount of heat such as a diode or a transistor can be disposed in the space of the second region.

It is preferable that a connector is provided in the second mounting region of the substrate and the connector is connected to a mate member via the opening. In other words, the opening is not only used as the drain for air but also used as a part of the connector. Accordingly, the configuration of the vehicle room light apparatus can be a simple one. Examples of the mate member are such as a connector for connecting the vehicle room light apparatus to a power source which provides electricity to the vehicle room light apparatus from the vehicle body or a connector for transmitting a control signal.

It is preferable to provide an insulator sheet on the back surface of the case since the inside of the case is surely insulated. The insulator sheet is provided so as to cover the back surface of the substrate and the back surface of the light source via a hook which is provided on the back surface of the case. Materials for the insulator sheet are not limited if they has insulate property, examples of which are polyethylene terephthalate resin or polycarbonate resin. The hook is preferably provided on the partition wall, disposed in proximity of a shorter side ends of the substrate, and disposed at height as same as or shorter than the substrate from the front surface of the case when viewed from a direction perpendicular to the partition wall. When the insulator sheet is attached to the hook, an area of the insulator sheet which is close to the hook intrudes into the case and whole or a part of the insulator sheet bends. Therefore, a lead of the mounting parts projected to the back surface side of the substrate (such as the switch or the resistance element) is prevented from touching the insulator sheet. Also since the insulator sheet bends and has a restoring force, a condition where the insulator sheet is supported (hanged) is secured. Thereby, it is possible to attach the insulator sheet to the case in a simple configuration without other parts such as a screw.

Figure 2:
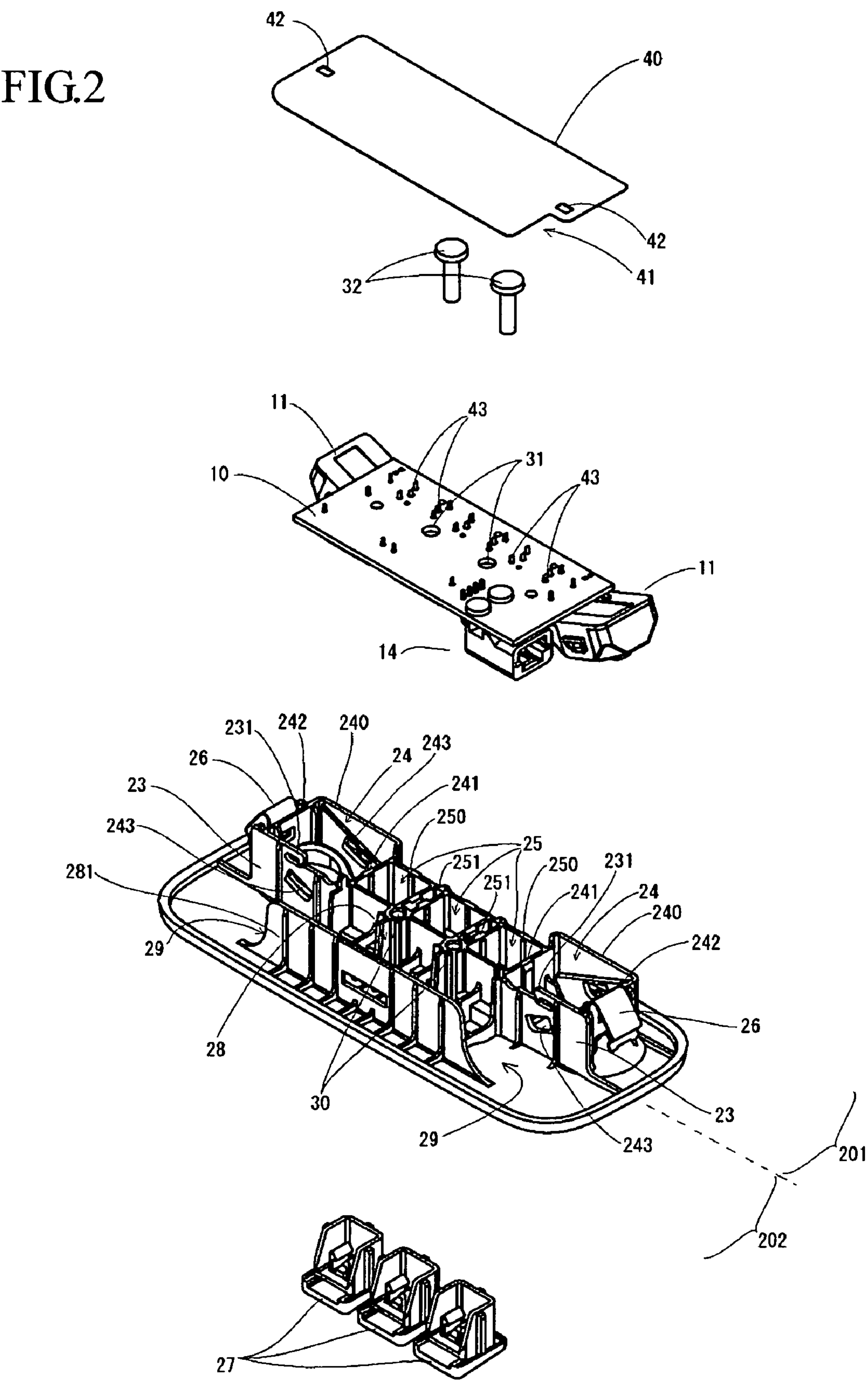
FIG. 2 is a perspective exploded view showing the exemplary embodiment of the vehicle room light apparatus seen form its back surface side.
Figure 3:
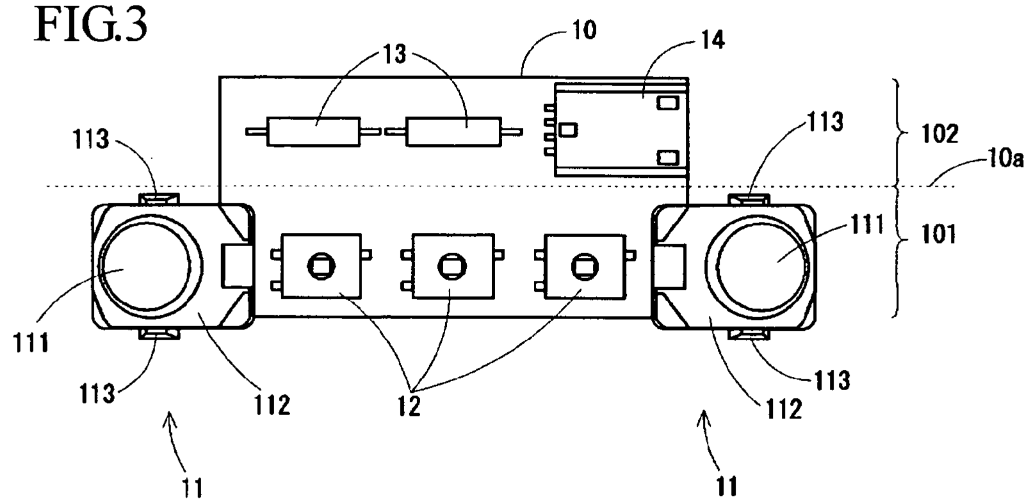
FIG. 3 is a top plan view of a substrate.

A perspective exploded view of an exemplary embodiment of a vehicle room light apparatus 1 of the present invention seen from its front surface side is shown in FIG. 1 and a perspective exploded view of the exemplary embodiment from its back surface side is shown in FIG. 2. The vehicle room light apparatus 1 roughly includes a substrate 10, a case 20 and an insulator sheet 40. FIG. 3 is a top plan view of the substrate 10. As shown in FIG. 3, the substrate 10 has a rectangular shape in the top plan view. The substrate 10 includes a first mounting region 101 (lower side in FIG. 3) and a second mounting region 102 (upper side in FIG. 3) which share an imaginary line 10*a* parallel to a longer side of the substrate as a boundary. Two LED lamp units 11 and three switches 12 are mounted in the first mounting region 101. Each of the two LED lamp units 11 is mounted at both ends of a shorter side of the first mounting region 101 respectively. The LED lamp unit is a lamp unit in which a white color LED lamp (not shown), a mounting substrate (not shown), and a lens 111 are packaged. The LED lamp units 11 have retaining projections 113 on its surfaces parallel to the longer side of the substrate 10.

The three switches 12 are disposed in line parallel to the imaginary line 10*a* at regular intervals. The switches 12 are push type switches. The three switches 12 are electrically connected to the LED lamp units 11 via a control circuit (not shown) provided on the substrate 10. A switch positioned at the center of the three switches 12 (a center switch) controls whether the lighting condition of the two LED lamp units 11 is related to the open-close condition of the vehicle door or not. In a condition where the center switch is turned on, the both LED lamp units 11 lights when the vehicle door is opened and the both LED lamp units 11 are turned off when the vehicle door is closed. On the other hand, switches positioned at both sides of the center switch (side switches) control the lighting condition of the LED lamp units 11 separately.

Two resistance elements 13 and a connector 14 are provided in the second mounting region 102. The two resistance elements 13 are provided so as to be parallel to the imaginary line 10*a*. The resistance elements 13 are connected to the control circuit (not shown) provided on the substrate 10. The connector 14 is opened from a shorter side of the second mounting region.

The case 20 is a plane which has rectangular shape in plan view and made of a polypropylene resin. The case 20 is formed by molding. As shown in FIG. 1, the case 20 has two light emitting holes 21 and three switch holes 22. Also, as shown in FIG. 2, the case 20 has a partition wall 23 on its back surface. The partition wall 23 passes the center of the case 20, is parallel to a longer side of the case 20, and stands on the back surface of the case 20. The partition wall 23 has hooks 231 each of which is provided in proximity of an end of a longer side of the partition wall 23. The upper side of FIG. 2 is the first region 201 and the lower side of FIG. 2 is the second region 202 with respect to the partition wall 23 as a boundary. The first region 201 has two LED lamp unit receivers 24 and three switch receiver 25. The two LED lamp unit receivers are provided at the two ends of the first region 201 respectively. The three switch receivers are disposed along the partition wall 23 and between the two LED lamp unit receivers.

The LED lamp unit receiver 24 accommodates the LED lamp unit. The LED lamp unit receiver 24 is a rectangular space defined by the partition wall 23, an outer wall 240 facing the partition wall 23, a wall 241 which is a boundary against the adjacent switch receiver, and a wall 242 facing the wall 241 and receives the LED lamp unit. The partition wall 23 and the outer wall 240 which define the LED lamp unit receiver 24 respectively have a retaining hole 243. The retaining hole 243 is a wide hole and a longer side of which inclines against the longer side of the partition wall 23 in a predetermined angle. Thus the retaining projections 113 of the LED lamp units 11 are retained in the retaining holes 243 respectively and the LED lamp unit 11 is fixed in the predetermined angle. Each LED lamp unit receiver 24 is connected to the light emitting hole 21 (see FIG. 1) and LED lamp units 11 emit light in the vehicle room toward a predetermined direction. Thus, the vehicle room light apparatus is used as a map lamp by illuminating the occupant's hand. Also, when the two LED lamp units 11 light simultaneously, the vehicle room light apparatus is used as a room lamp.

The wall 242 has a retaining spring 26 on its outer side. The retaining spring 26 is retained by a retaining portion (not shown) which is provided on a ceiling of the vehicle room. Thereby, the vehicle room light apparatus is fixed to the ceiling of the vehicle room without parts such as a screw. The switch receiver 25 is a rectangular space defined by the partition wall 23, an outer wall 250 facing the partition wall 23, a wall 251 facing the wall 241. Three switch receivers 25 are provided and arranged in line along the partition wall 23. Three switches 12 are accommodated in the three switch receivers 25 respectively. The switch receiver 25 continues to the switch hole 22 (see FIG. 1). Each of the switches 12 accommodated in the switch receiver 25 is engaged with a switch knob from the front surface side of the case 20 via the switch hole 22.

The second region 202 has a space 28 and an opening 29. The space 28 is defined by the partition wall 23 and an outer wall 281 which faces the partition wall. The space 28 extends along the partition wall so as to be parallel to the longer side of the case 20. The outer wall 281 is shorter in length than the partition wall 23 in a longer side direction and thereby both ends of the space 28 form openings 29. When the substrate 10 is attached to the case 20, the resistance elements 13 and the connector 14 are positioned in the space 28. The terminal of the connector 14 faces the opening 29 and is connected to the mate connector (not shown) provided on the vehicle body.

The case 20 has two screw holes 30 on the partition wall 23 which defines the switch receivers 25 and the substrate 10 has holes 31 at positions facing the screw holes 30 respectively. The substrate 10 is fixed to the case 20 by screwing a screw 32 against each screw hole 30 via corresponding hole 31.

Figure 4:
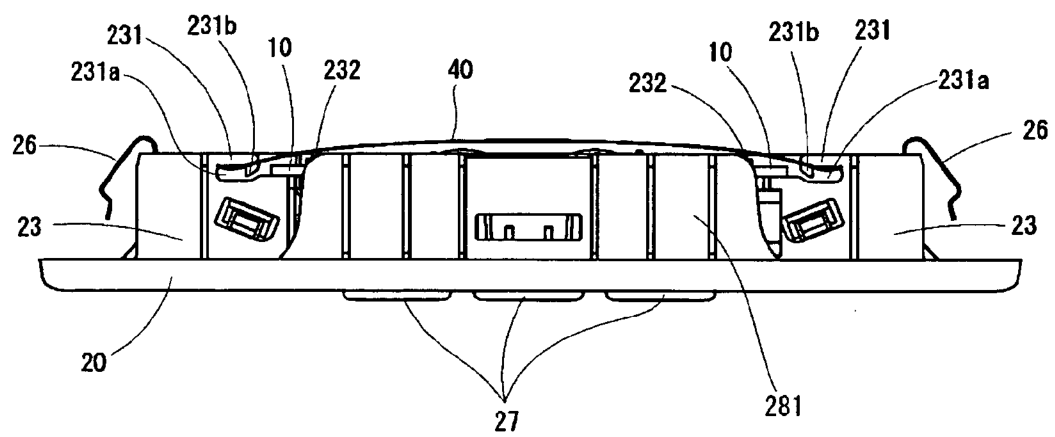
FIG. 4 is a bottom plan view of the exemplary embodiment of the vehicle room light apparatus.

The insulator sheet 40 is provided on the back surface side of the substrate 10 (opposite side of the case 20). The insulator sheet 40 is a sheet made of polyethylene terephthalate. Although a shape in plan view of the insulator sheet 40 is substantially same as that of the substrate 10, the insulator sheet 40 has a cutout portion 41 in proximity of the connector 14. The cutout portion 41 prevents the insulator sheet 40 from interfering the connector 14 or the mate connector. The insulator sheet 40 has a hole 42 at the center of the both shorter sides. The insulator sheet 40 is attached to the case 20 via the hook 231 provided on the partition wall 23. FIG. 4 shows a bottom plan view of the vehicle room light apparatus in a condition that the insulator sheet 40 and the substrate 10 are attached to the case 20. As shown in FIG. 4, a cut portion 231 a extending along the longer side of the case 20 is provided at an upper end of the partition wall 23 (end of the partition wall at the opposite side of the front surface side of the case). By virtue of the cut portion 231*a*, a nail 231*b* which directs the front surface side of the case 20 is formed on the hook 231. The hook 231 is provided at substantially same position as the substrate 10 in a width direction of case 20 (top-bottom direction of the paper in FIG. 4). Thereby, when the holes 42 of the insulator sheet 40 are respectively retained by the hooks 231, the insulator sheet 40 abuts an upper portion 232 of the partition wall 23 and bends. Thereby, the insulator sheet 40 can be attached to the case 20 in a simple manner without parts such as a screw. Also, interference between the insulator sheet 40 and the lead nibs 43 projected from the back surface of the substrate 10 (see FIG. 2) is prevented.

Figure 5:
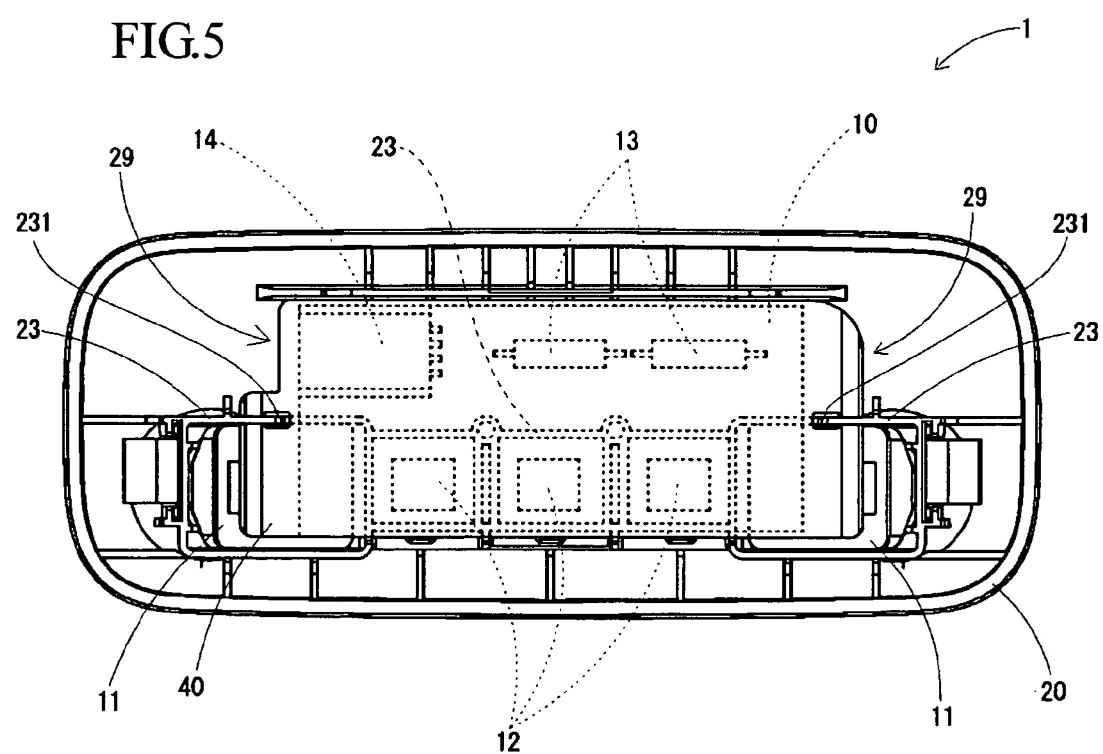
FIG. 5 is a rear side view of the exemplary embodiment of the vehicle room light apparatus.

FIG. 5 shows a rear side view of the vehicle room light apparatus. According to the vehicle room light apparatus 1, since the LED lamp units 11 are directly attached to the back surface of the case 20 and the front surface of the case 20 serves as a designed surface, the number of the parts reduced as compared with the conventional configuration in which a housing, a bracket, and a bezel are used. Also, the reduced number of the parts enables the vehicle room light apparatus to be small in size. Further more, the first region 201 and the second region 202 which are separated by the partition wall 23 are provided on the back surface of the case 20. The LED lamp units 11 and the switches 12 are mounted on the first region 201, the space 28 and the openings 29 are provided on the second region 202, and the resistance elements 13 are mounted on the space 28. Although the resistance elements 13 generate a lot of amount of heat, the heat dissipation from the vehicle room light apparatus is enhanced since the resistance elements 13 are provided on the space 28 and thereby the heat dissipation from the resistance elements 13 is promoted. The openings 29 are provided on the both ends of the second region 202. Thereby, since the openings 29 work as a drain and source of air, heat dissipation is enhanced. Since the space 28 which linearly extends along the long side of the partition wall 23 enables air to flow in a direction along the long side, heat dissipation is more enhanced.

Thus, the vehicle room light apparatus 1 according to the present invention achieves high heat dissipation because the vehicle room light apparatus 1 separately includes the first region 201 on which the LED lamp units 11 and the switches 12 are mounted and the second region 202 which has high heat dissipation, the each region is ensured, and heat generated from the resistance elements is effectively dissipated. Also, since the LED lamp unit receivers 24 and the switch receivers 25 are separated by the wall 241 (the second partition wall), it is prevented that heat generated from the LED lamp units 11 conduct to the switch receivers 25. Thus this configuration contributes to promote heat dissipation from the vehicle room light apparatus as a whole.

The present invention can be utilized for a light apparatus which illuminates inside of a vehicle room of any kinds of vehicle.

The invention claimed is:

1. A vehicle room light apparatus comprising:

a light source;

a switch; and a case including a front surface as a designed surface and a back surface, the back surface having a first region on which the light source and the switch are arranged in line, a second region which has a space extending along the first region and an opening continuing to the space, and a partition wall which separates the first and the second regions.

2. The vehicle room light apparatus according to claim 1, wherein a resistance element is provided on the second region.

3. The vehicle room light apparatus according to claim 2 further comprising:

a substrate attached to the back surface of the case and including a first mounting region positioned in the first region on which the switch is mounted, and a second mounting region in the second region on which the resistance element is mounted.

4. The vehicle room light apparatus according to claim 1, wherein the opening is provided at both ends of the second region.

5. The vehicle room light apparatus according to claim 1, wherein the light source is directly attached to the back surface of the case.

6. The vehicle room light apparatus according to claim 1, wherein the back surface of the case has a hook and a insulator sheet which covers a back surface of the substrate and the light source.

7. The vehicle room light apparatus according to claim 6, wherein the hook is provided on the partition wall, disposed in proximity of a shorter side ends of the substrate, and disposed at height as same as or shorter than the substrate from the front surface of the case when viewed from a direction perpendicular to the partition wall.

8. The vehicle room light apparatus according to claim 1 further comprising:

a connector connected to a mate connector via the opening.

* * * * *